July 21, 1964     J. F. STEPHENS     3,141,206
EDGE SEALING INSULATION PANELS
Filed Oct. 2, 1957     2 Sheets-Sheet 1

INVENTOR.
Joseph F. Stephens
BY
ATTORNEY.

INVENTOR.
Joseph F. Stephens
BY
ATTORNEY.

United States Patent Office 3,141,206
Patented July 21, 1964

3,141,206
EDGE SEALING INSULATION PANELS
Joseph F. Stephens, Kansas City, Mo., assignor to Gustin-Bacon Manufacturing Company, a corporation of Delaware
Filed Oct. 2, 1957, Ser. No. 687,679
3 Claims. (Cl. 20—15)

This invention relates to thermal insulation in panel form and refers more particularly to panels having special adaptability and usefulness in insulating railway cars, truck trailers and other rolling stock.

It has been established that in the case of moving insulated vehicles, such as refrigerated truck trailers and railway refrigerator cars, the major source of heat gain and moisture accumulation within the insulated space results from warm air entering openings or cracks in the outer shell and penetrating the insulation space. This is particularly true where the insulation is porous fibrous mat not faced or covered with vapor barriers such as aluminum foil or various plastic films. The pressurized warm air penetrates freely through the mat with two distinct detrimental effects: (1) There is an increase in the moisture content of the compartment with the result that there is a great deal of condensation on various surfaces, including the mat material; and (2) greater quantities of warm air are introduced into the compartment with the result that convection refrigeration losses are severe.

The above difficulties are also present even where the insulation is faced with a suitable vapor barrier, the primary reason being that it is difficult, if not impossible, to seal against the intrusion of air through gaps or cracks which inevitably exist between the structural facing for the interior of the vehicle and the margins of the insulation mats. Under still air conditions, represented by such a vehicle at rest, the moisture accumulation is but a small percentage of that which takes place with the vehicle in motion, and likewise, with no forced convection refrigeration losses, the losses are substantially lower. This means that an insulation pervious to air, even though highly efficient when installed within a completely enclosed space under still air conditions, can be relatively inefficient under the conditions set forth above.

The increased moisture problem noted above has caused adoption of remedial measures in the case of floor insulation. In floors of such refrigerated cars and trailers there is a great tendency to accumulate water as run-down of the condensation from roofs and tops and as leakage through the floors from certain types of lading or from supplementary icing or washout operations. The low density fibrous types of insulation under such conditions tend to mat down and decrease in thickness with derogation of their insulating efficiency, and even if such space is quickly dried out, the insulation is impaired as it does not fully return to its original state or full thickness. In floors, therefore, certain types of plastic foam insulation have been employed, notably polystyrene foam which is made from polystyrene plastic, the air cells of the foam being enclosed, and thus opposing the entry of either air, water vapor or water. Even though heavily saturated, such material retains its dimensional stability.

However, the rigid foams still are ineffective to fully prevent the forced air entry noted earlier. This is because of the fact that even though the panels thereof are intended to fit approximately between the structural bracing of the compartment, nevertheless, they do not abut tightly or seal at their edges against the structural members, thus leaving gaps. Therefore, the forced air entering through cracks in the outer shell can pass around the insulation and enter the compartment.

One of the primary objects of the present invention is to provide a means of insulating the compartments of moving vehicles in such fashion as to overcome the problems set forth above. While individual insulation panels cut to fill the various spaces formed by the internal structural members of the compartment are used, nevertheless an effective air seal is formed between the surfaces of the panels and the adjoining surfaces of the structurals to prevent the intrusion of outside air even when the vehicle is moving at high speeds.

Another object of the invention is to provide insulation panels which are capable of maintaining their integrity under severe operating conditions.

A further object of the invention is to provide a means for insulating the interiors of trailers, railway cars and the like which can be prefabricated according to drawings or blueprints of the trailer or car in which it is to be installed, and which can be successfully installed despite any variations from the drawings in the actual vehicle so long as said variations are still within the customary tolerances permitted in this type of construction.

Still another object of the invention is to provide an insulation panel which is capable of inherently supporting itself between the structurals following installation and in which no tacking, nailing or other direct means for securing the panels to the structurals is required.

An additional object is to supply an insulation panel which is light in weight, highly efficient from a thermal standpoint and which is resistant to the absorption of moisture, thus preventing an increase in the tare weight of the vehicle by collection and retention of condensed moisture.

A further object is to provide an insulation panel which is neat in appearance, which can be installed quickly and easily, thus saving on labor costs in assembly with the vehicle, and which is capable of withstanding long and rugged use.

Still another object is to provide a method of manufacturing such panels with ease and facility.

Other and further objects of the invention together with the features of novelty appurtenant thereto will appear in the course of the following description.

In the accompanying drawings which form a part of the instant specification and are to be read in conjunction therewith, and in which like reference numerals indicate like parts in the various views.

Figure 1:
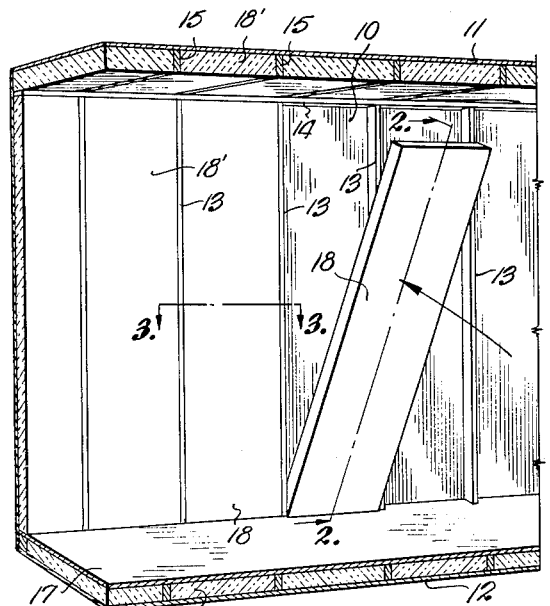
FIG. 1 is a perspective view of a fragmentary section of the interior of a typical truck box or railway car illustrating a preferred form of the panel assembly and method of installation.
Figure 2:
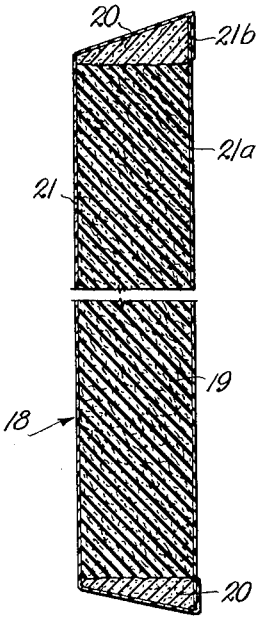
FIG. 2 is an enlarged sectional view taken along the line 2—2 of FIG. 1 in the direction of the arrows, the break lines indicating length.
Figure 3:
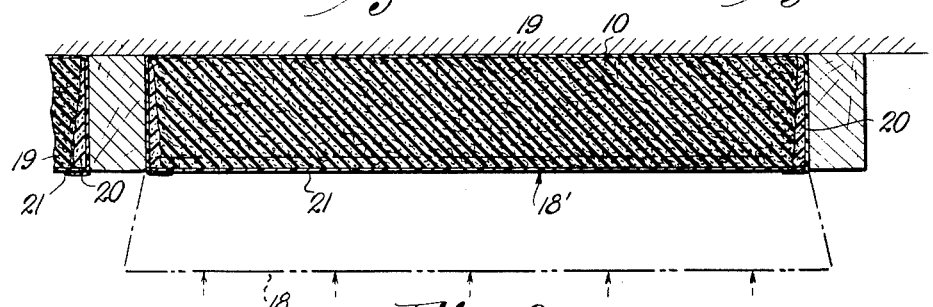
FIG. 3 is an enlarged sectional view taken along the line 3—3 of FIG. 1 in the direction of the arrows, the broken lines indicating the normal shape of the panel prior to installation.

FIGS. 6–11, inclusive, illustrate schematically steps in forming the panel of FIGS. 1, 2 and 3.

Referring to the drawings, and initially to FIGS. 1, 2 and 3, in FIG. 1 I have shown for illustrative purposes a section of the interior of a typical railway car or truck body, the internal bracing being somewhat simplified to aid in quick understanding of the invention. Reference numeral 10 indicates one side wall of the shell which may be formed of metal plates welded or bolted to one another and to the internal bracing in the usual fashion. While not shown, it will be understood that customarily there are holes and cracks in shells of this type; in other words, that they are far from airtight.

Reference numeral 11 indicates a section of the roof of the shell, and 12 is the subfloor. Supporting the side walls are a plurality of spaced vertical studs 13, and at the juncture of these studs with the roof is a horizontal sill 14. The transverse roof beams are indicated at 15 and the floor joists at 16. A suitable decking 17 may be supported on the joists 16, this being spaced above the subfloor and extending to the sidewall 10.

As is believed evident from the description thus far, the skeleton structure framework of the compartment thus comprises the walls and various studs, joists and beams. By virtue of the arrangement employed, the inside of the compartment thus presents a plurality of relatively shallow open face cavities or recesses, the side and end walls of the cavities being defined by the bracing. For the sake of simplicity I have shown these cavities as of elongate rectangular configuration. However, as will be evident as the description proceeds, the configuration of the internal bracing is of no importance other than determining the shape of the insulation panels which embody the invention. I have also shown the internal bracing as being simple wooden structurals such as, for example, lengths of 2 x 4; however metallic structurals of the usual shapes are equally suitable so long as they have surfaces projecting from the inner surface of the walls of the compartment to define cavities for receiving the insulation panels now to be described.

In FIG. 1 there is shown at 18 a panel according to a preferred form of the invention, the panel being positioned for installation. This panel is of similar plan of the wall cavity in which it is about to be received, being an elongated rectangular block of a thickness substantially but not necessarily equal to the depth of the studs 13. As is clearly evident from FIG. 3 where the broken lines indicate the outline of the panel cross section in its normal condition, the outer face of the panel is of greater width than the cavity in which it is to be received, as is also true of the length in a vertical direction. Stated otherwise, in its normal condition the panel is geometrically similar to the shape of the cavity but its area at some point through its thickness is greater than the area of the cavity at the entrance thereto so that the panel is incapable of entering fully into the cavity without deformation of one or the other.

In its preferred form the panel 18 is formed of three elements which are best seen in FIGS. 2 and 3. The main body of the panel comprises a block 19 of relatively rigid thermal insulation material. Formed on or attached to at least one edge, but preferably extending completely around the perimeter of the main body, is a more resilient and compressible section 20 which has the property of lending itself to edge wise compression as the panel is installed, as will be later described in more detail. In the case of porous or air permeable insulations the entire assembly is covered by a flexible sealed vapor barrier 21 which may take the form of two sheets 21a and 21b having overlapping edges secured to one another by a suitable adhesive. Various thermal insulation materials can be used in the construction of the panels so long as the requirements of stiffness in the major plane of the panel coupled with the resilience at the edges in a direction normal to the edges is achieved. Examples of the more satisfactory compositions I have found will be hereinafter presented.

In one type of panel the composition of the block 19 is a rigid or semi-rigid foam of urethane. As is known in the art, the urethane foams result from intimate mixture of polyol and diisocyanate plus certain water-bearing activating and processing materials. The basic reactions involved in making flexible, semi-rigid and rigid foams are similar in nature, differing chiefly in the type of polyol used and the ratios of the components. The foams are cellular materials in which the cell structure is created by internally generated gases and not by the addition of blowing agents as is the case in most other foam products. The distance between reaction sites governs the type of foam produced. For simplicity this distance may be referred to in molecular weight units. If a low molecular weight tri-functional polyester is reacted with a diisocynate, these distances are quite short and a brittle friable foam will result. By further changing the polyol to increase the distance between the linking sites, a soft flexible foam may be made. For example, a long straight chain diol of 1500 to 3000 molecular weight will give an elastic or rubber-like foam. Using glycerin, castor oil or other short chain polyol yields foams which are quite rigid. I have successfully used a castor oil foam as the material for the block 19.

In this example, the dimensions of the main body block 19 are such that by itself it could be fitted easily into the wall cavity without forcing.

Adhered around the edges of the main body block 19 is a continuous compressible and resilient edging 20. In the FIG. 2 panel this is also a urethane foam, but one which is more flexible and resilient than the foam composing the main body, having good compression and return characteristics. As noted above, resilient urethane foams of this type are well known in the art, as are foams of similar properties. The resilient edging is firmly adhered to the main body either by chemical union or suitable adhesives, depending on the composition used, and is applied in a thickness sufficient to increase the dimensions of the panel to a point where it cannot be introduced into the cavity without forcing. Preferably, but not necessarily, the margin of the edging is bevelled as shown so as to increase the ease of forcing the panel into the cavity as will later be described.

Where urethanes are used, a resilient foam is of the interconnected cell or porous type, the degree of porosity being roughly proportional to the degree of resilience and flexibility. Accordingly, in this instance it is desirable to enclose the resilient edging 20 with a nonpermeable flexible barrier to prevent penetration of air therethrough. Preferably this barrier is in the form of the envelope 21 completely enclosing the entire panel and adhered thereto with a suitable adhesive. A suitable barrier is a calendered vinyl film, a 4-mil thickness having proved quite suitable. Of course, other film or coating materials may be used, the objects being to provide an airtight covering for the air pervious material.

As shown in FIGS. 1 and 3, installation of the panel is accomplished by merely positioning the panel adjacent the open end of the cavity and forcing it inwardly into the cavity. As the panel moves inwardly between the walls of the cavity, the resilient edging 19 is compressed toward the center of the panel. The rigid or semi-rigid main body 18 provides sufficient stiffness to resist bending of the panel during installation. FIG. 3 shows the panel in its final installed condition. The edging is compressed to a fraction of its normal thickness and by virtue of its resilience bears tightly against the adjacent surfaces of the structurals to thus form a substantially airtight seal while at the same time establishing a high degree of frictional contact between the panel and structurals which resists removal of the panel from the cavity. This seal is continuous around the margin of the panel and thus there is little, if any, possibility of air leakage past the panel. Reference numerals 18' in FIG. 1 indicate panels which have been installed in the fashion described above.

The degree of flexibility and resiliency of the panel edging 20 can be varied within wide limits, depending on the tightness and efficiency of the seal desired. I have found that in certain applications, approximations of the desired results can be obtained by forming the entire panel of a semi-rigid foam, the edges having sufficient compressibility relative the overall stiffness of the panel to permit of sufficient inward deformation to form a fairly effective seal.

Figure 4:
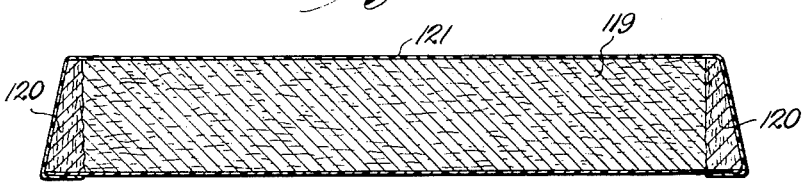
FIG. 4 is a cross section through a modified form of a panel embodying the invention.

FIG. 4 illustrates another embodiment of a panel according to the invention. In this case the panel is formed of a block of rigid foam 219 similar to the main body of FIGS. 1, 2 and 3. If desired, the edges may be tapered or bevelled. An envelope 221 encloses the block of foam. The edging 220 in this case comprises a strip of closed cell material such a "sponge" vinyl or latex which has excellent compressibility and resilient characteristics. Since the closed cell construction renders the edging impermeable to air, no additional barrier or film is required.

By utilizing the rigid and semi-rigid closed cell foams for the main body of the panels, it is possible to construct panels in thicknesses of 2 inches to 6 inches and of lateral dimensions as large as 10 feet by 4 feet. It will be evident that any configuration other than rectangular may be employed and that thus the panels can be tailored to any shape to fit a wide variety of cavities.

In FIGS. 6–11 there is shown schematically a method of fabricating a rectangular panel of the type illustrated in FIGS. 1, 2 and 3. Reference numeral 30 represents a traversing foaming head of the usual construction positioned to lay transverse strips of unexpanded foam material 31 on a moving endless conveyor belt 32. The belt preferably has supported on it and positioned to receive the foam a sheet 21a of flexible barrier material such as the calendered vinyl film mentioned earlier. A wooden frame having flared sides 33 is positioned on the conveyor. While only two sides of this frame are shown it will be understood that it is of closed rectangular construction having similarly flared ends. Positioned inside the flared sides and ends are removable partitions 34 which provide confining vertical walls inboard of the flared sides and ends of the frame.

Figure 6:
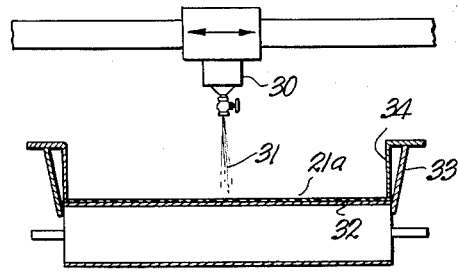
Figure 7:
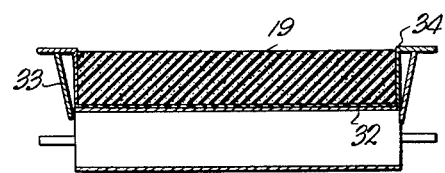

In producing the panel the first step is as shown in FIG. 6, this comprising laying strips of the rigid foam composition on the film sheet 21a as the belt is moved beneath the traversing head. Sufficient foam is laid down as to cause, when expanded, a thickness equal to the desired panel thickness, as, for example, 2 inches. This step thus results in the initial formation of the central block or main body 19 of the panel as earlier described. The block is illustrated in expanded form in FIG. 7, being faced on one side with the film 21a.

Figure 8:
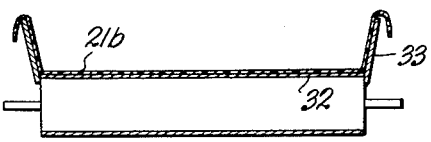

The next step, according to the preferred method, is to remove the block 19 with the facing 21a thereon from the frame. The inner vertical partitions 34 are then also removed from the frame and a second sheet of film 21b is placed on the belt inside the frame as shown in FIG. 8. The second sheet has sufficient width and length to lap out over the edges of the frame as illustrated.

Figure 9:
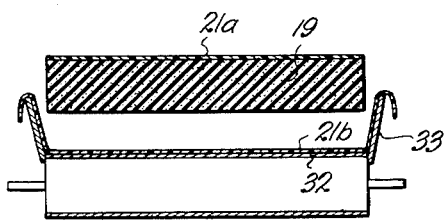

The block 19 formed in the initial step is then reintroduced as shown in FIG. 9 to the frame with its faced side uppermost. If desired, an adhesive may be coated on the second film sheet prior to contacting the block 19 therewith.

Figure 10:
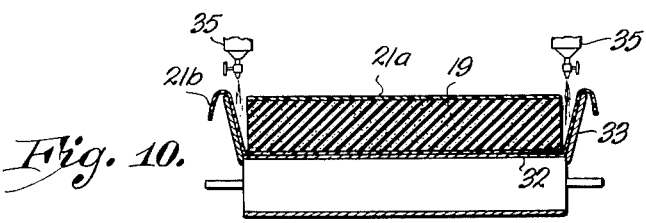
Figure 11:
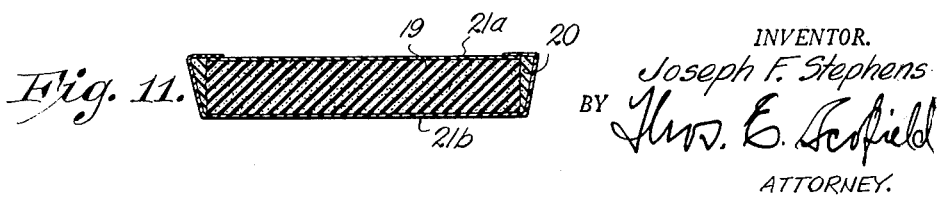

As shown in FIG. 10, when the block is reintroduced with the vertical partition 34 removed, a V-shaped gap is located around the periphery of the block. This gap is filled, as shown, with the more resilient foam from foam heads 35. The free edges of sheet 21b are then lapped back over the sheet 21a and are adhered thereto by any suitable means to arrive at the completed panel shown in FIG. 11.

As an alternative to the above method, the oversized film sheet 21b can be substituted in FIG. 6 for the smaller sheet 21a. When foaming of the block 19 is completed, the partitions 34 can be removed and the sheet 21b pulled free of the edges of the block so that they will lie as in FIG. 10. Following this, sheet 21a is secured to the upper face of the block, the edging foam is introduced into the gap and the panel completed as previously described.

While panels constructed entirely of foamed plastics are admirably suited to the objects desired, I do not intend to limit the invention thereto. There are many other insulating materials wherein the different degrees of stiffness and resiliency necessary may be obtained. As an example I have shown in FIG. 5 a panel of fibrous composition which embodies the principles of construction hereinbefore set forth.

Figure 5:
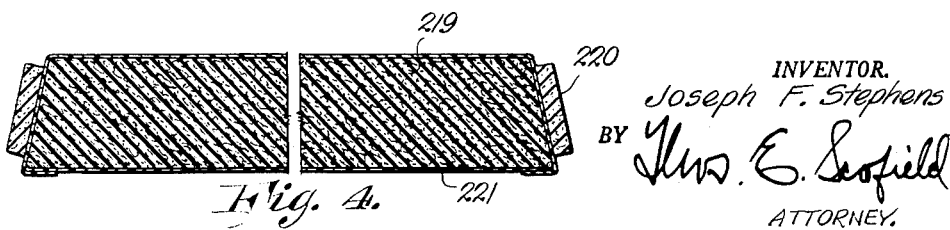
FIG. 5 is a cross section through another type of panel.

The main body or central block 119 of the panel of FIG. 5 comprises a relatively stiff mat composed of glass fibers bonded into an integrated mat form by a suitable heat reactive binder, the binder joining the fibers at their intersections only, thus to provide a structure having good insulating properties as well as a high degree of dimensional stability. Mats of this type are known in the art and a suitable method of forming them can be found in Sheidley Patent 2,619,151, issued November 25, 1952, and Stephens et al. Patent 2,778,759, issued January 22, 1957. While the latter patent deals more particularly with a cylindrical tube-like pipe covering, the initial mat from which the pipe covering is made, cured in flat and compacted condition to the densities hereinafter set forth, is one well adapted to the purposes of the present invention.

The binder utilized in the formation of the block 119 may be any one of a number of heat reactive materials such as, without limitation, phenol condensation products, melamine resins, ureaformaldehyde resins, urea-melamine resins, vinyl chloride acetate resins or the like. As is disclosed in the aforementioned patents the fiber is collected on a foraminous barrier by gravity or air deposition, which results in a relatively random orientation of the fibers, that is, with the fibers heterogeneously oriented in a three dimensional network. The binder is preferably introduced either in particle or liquid form to the stream of fibers moving toward the barrier in order to obtain optimum distribution of the binder throughout the collected mass.

While in the patents referred to above effort is maintained to preserve insofar as possible the completely random orientation of the fibers, the preferred central block 119 of the present invention is one in which the fiber lay is predominantly substantially parallel with the major faces of the block. This orienting of a predominant portion of the fibers in the condition described is accomplished through compression of the mat to a lesser thickness than its original air laid thickness while curing the binder. Suitable apparatus for accomplishing this purpose is well known in the art. For example, in one type of curing oven the uncured mat is transferred to a steel flight conveyor which passes through the oven. Such an oven conveyor commonly has positioned thereabove a second conveyor also passing through the oven, the flights of which are in a parallel plane to those of the conveyor on which the mat is carried through the oven. The oven conveyors are adjustable upwardly and downwardly with respect to each other so that the space between their flights may be varied to govern and control the thickness and density of the mat. By regulating the distance between the flights of the respective conveyors it is possible to compress the mat structure to any desired degree as curing takes place.

In order to obtain the requisite stiffness in the major plane and resistance to compression in a direction normal to the edges, the central block 119 should be composed of mat having a density in excess of one pound per cubic foot. The best results in terms of strength related to weight occur in the range of densities of one to three pounds per cubic foot. At these densities the mat has the capacity of being self-supportable so that it can be handled as a rigid or semi-rigid structure. At the densities mentioned the range of weight of binder based on weight of glass fiber or strands in the mat is from 11% to 34%.

The edging 120 of the FIG. 5 panel is also composed of fibrous mat of the character described, but it is so applied that the predominant lay of the fibers in the edging is normal to the major faces of the main body 119. The reason for this is that in such mats, that is, mat with the fibers predominantly parallel with the faces of the mat, the mat is considerably more resilient in the direction normal to the major faces than it is in the direction normal to the edge. The edge material can be formed from strips of mat of the type earlier discussed, the strips being turned 90° when applied to the main body to obtain the requisite resiliency. The density of the edge material should also be in the range of from one to three pounds per cubic foot with a binder percentage of from 11% to 34% based on the weight of fibers in order to obtain the desired resilience and compressibility so that the panel will be capable of being wedged between the structurals and will establish a sealing arrangement therewith.

It will be understood that the edging 120 is secured to the main body 119 by any suitable adhesive. To complete the panel the entire fiber structure is enveloped by an air impervious outer film or coating 121 such as the calendered vinyl film earlier described.

As an alternative to forming the edging 120 of fibrous material, a resilient foam of the types earlier described may be substituted.

To illustrate the composition and manner of construction of a panel of glass fiber the following example is given. To form a panel three inches thick and 8 feet by 4 feet in lateral dimensions the perimeter or edge material 120 should be approximately two inches thick. To form the panel I start with a slab of mat material three inches thick. I first cut from it a piece 7 feet 8 inches by 3 feet 8 inches which piece would form the central body portion 119. I then cut from a slab of mat two inches thick a piece three inches wide and of sufficient length to go around the perimeter of the central body portion 119. This perimeter or edging piece is then disposed around the edges of the central body with the three inch width disposed in the direction of the thickness of the central body portion. Thus what was once the major face of the slab of mat from which the permieter piece is cut would become the edge faces of the entire panel when the edging is adhered to it. The edging is so disposed as to present its former major face to the direction of compression.

From the foregoing it will be evident that I have accomplished all of the ends and objects hereinbefore set forth. By providing a rigid or semi-rigid panel having resiliently deformable edges the panel is capable of so sealing at its edges against structural members as to make difficult the by-passing of the panel by moisture laden hot air or the infiltration of such air into the insulated space. Despite the resiliency of the edges the panel still has sufficient integrity and rigidity to permit of relatively large pieces being readily handled in such fashion as to crowd them or plug them into the cavities to be insulated so that prefabricated panels can be shipped to car builders, truck trailer builders, and the like in car sets in which the individual panels will conform to the space defined by the structural members and completely fill such spaces even though there should be construction tolerances unavoidable in the carpentry or in the weldments involved in the structures and also making possible substantial savings in installation costs of the insulating material. Moreover, the panel of the present invention has a high degree of impermeability to air and moisture vapor.

While I have shown a panel having a resilient edging extending completely around the perimeter thereof, it will be appreciated that in certain applications this may be unnecessary. While I prefer the continuous edging, nevertheless I do not wish to be limited specifically thereto, since it is conceivable that panels edged only on one, two or three sides may be employed in certain special instances.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. An insulation panel adapted to be pressed fitted into an open space defined by at least two structural supports comprising a main block composed of bonded fibrous mat honeycombed with interstitial air spaces and having opposed parallel major faces, the width of said block being less than the spacing of the supports and the lay of the fibers therein being predominantly parallel with the major faces of the mat whereby to resist compressive displacement of the edges of the block in a direction normal to the major faces and stiffen the block against flexure out of the normal major plane thereof, and an edging secured to the block and forming a continuation thereof, said edging dimensioned to increase the width of the panel beyond the spacing between the structural supports, said edging comprising a bonded fibrous material honeycombed with interstitial air spaces and having the predominant lay of the fibers normal to the major plane of the main block whereby to provide the edging with resiliency and yieldability to forces exerted thereagainst in directions parallel to the major plane of the block.

2. An insulation panel as in claim 1, including a pliable film enveloping the panel in its entirety to render it impermeable to air and moisture vapor.

3. An insulation panel as in claim 1 wherein the density of said fibrous mat is between 1 and 3 pounds per cubic foot, the fibers being predominantly of a diameter on the average of 10 microns or less and the content of binder being in the range of 11 percent to 34 percent by weight.

References Cited in the file of this patent

UNITED STATES PATENTS

| | | |
|---|---|---|
| 366,222 | Kelly | July 12, 1887 |
| 681,938 | Stevens | Sept. 3, 1901 |
| 2,094,265 | Curren | Sept. 28, 1937 |
| 2,312,987 | Grassick | Mar. 2, 1943 |
| 2,774,104 | Miller | Dec. 18, 1956 |
| 2,780,350 | Simon et al. | Feb. 5, 1957 |
| 2,833,001 | Montefalco | May 6, 1958 |
| 2,858,580 | Thompson | Nov. 4, 1958 |
| 2,864,123 | Gora | Dec. 16, 1958 |
| 2,869,336 | Smidl | Jan. 20, 1959 |